United States Patent [19]

Barker et al.

[11] 4,137,002

[45] Jan. 30, 1979

[54] HIGH SPEED COOLANT FEEDING GUN DRILL AND CUTTING HEAD SECTION THEREFOR

[75] Inventors: Edison D. Barker, Kettering; John A. Cook, Dayton, both of Ohio

[73] Assignee: General Motors Corporation, Detroit, Mich.

[21] Appl. No.: 857,525

[22] Filed: Dec. 5, 1977

[51] Int. Cl.² .................... B23B 27/10; B23B 51/06
[52] U.S. Cl. .................................................. 408/59
[58] Field of Search ............... 408/59, 57, 56; 407/11

[56] References Cited

U.S. PATENT DOCUMENTS

| 516,277 | 3/1894 | Parks | 408/205 |
|---|---|---|---|
| 1,202,782 | 10/1916 | Blauvelt | 408/118 |
| 1,323,278 | 12/1919 | Hoagland | 408/57 |
| 1,379,853 | 5/1921 | Cogsdill | 51/288 |
| 1,746,716 | 2/1930 | Sasse | 408/59 |
| 2,334,089 | 11/1943 | Hallden | 408/211 |
| 2,348,874 | 5/1944 | Andreasson | 408/57 |
| 2,391,396 | 12/1945 | Denison | 408/230 |
| 2,640,379 | 6/1953 | Graves | 408/228 |
| 2,786,373 | 3/1957 | Patton | 408/59 |
| 2,898,786 | 8/1959 | Willingham | 408/59 |
| 2,912,887 | 11/1959 | Andreasson | 408/57 |
| 3,014,386 | 12/1961 | Kallio | 408/211 |
| 3,040,605 | 6/1962 | Andreasson | 408/59 |
| 3,073,189 | 1/1963 | Paige | 408/59 |

FOREIGN PATENT DOCUMENTS

| 854545 | 1/1940 | France | 408/59 |
|---|---|---|---|
| 199542 | 11/1938 | Switzerland | 408/59 |

Primary Examiner—Leonidas Vlachos
Attorney, Agent, or Firm—D. D. McGraw

[57] ABSTRACT

A straight fluted gun drill having large flutes providing chip exit channels, various reliefs improving coolant flow and removal of drilled material without clogging, a cutting head section with large back taper, and straight lands forming the flutes.

3 Claims, 5 Drawing Figures

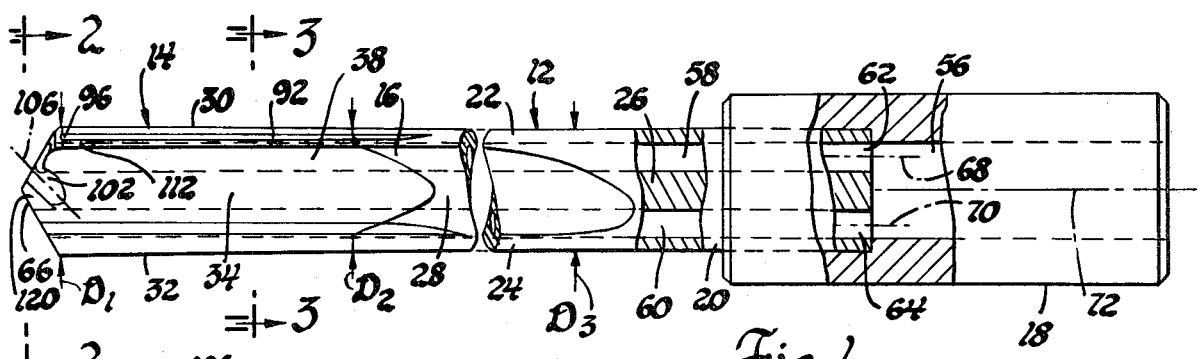
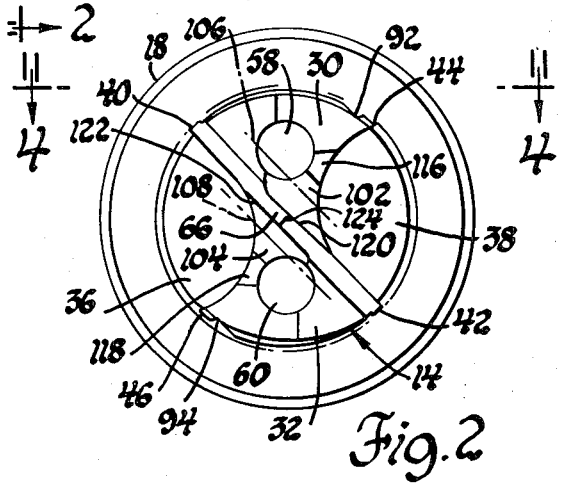
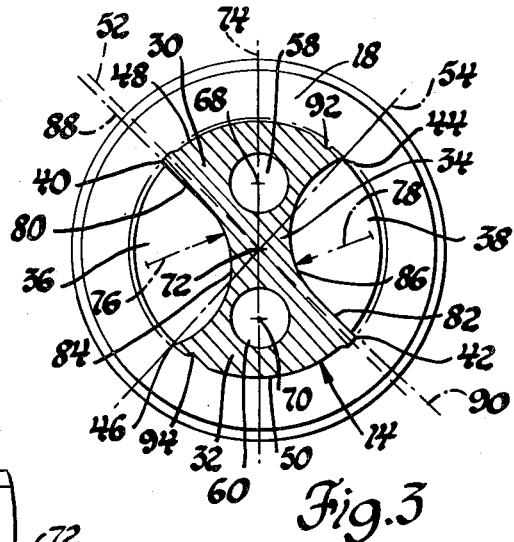
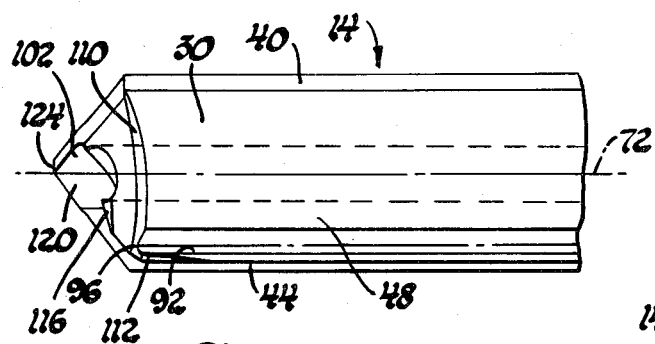
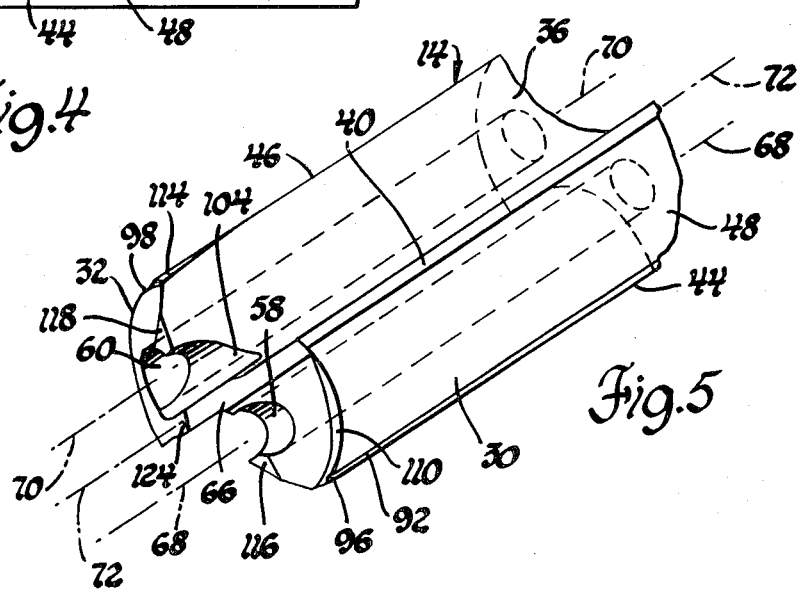

HIGH SPEED COOLANT FEEDING GUN DRILL AND CUTTING HEAD SECTION THEREFOR

The invention relates to a straight fluted gun drill and a cutting head section for such a gun drill. It more particularly relates to a drill which will drill blind holes at high speeds in materials such as aluminum while maintaining tool life comparable to that of lower speed drills.

The problem solved by the invention was presented when it was decided that some master cylinders would be manufactured of aluminum bodies and the bores therein would be drilled by gun drills. It was found that conventional drills available on the market would not satisfactorily drill holes at a penetration rate greater than about 15–20 inches per minute when the holes being drilled were about ¾" to 1¼" in diameter. Faster penetration rates resulted in high tool wear, requiring tool regrinds after as few as 20 or 30 holes had been drilled and seldom more than 150–200 holes had been drilled. In order to maintain a satisfactory production rate, it was required that the drills have a penetration rate of about 60 inches per minute or more, that the drills be able to drill 1,000 or more holes before regrind, and that 10 or more regrinds be available before the drill was no longer useful. It was found that twist type drills would not perform satisfactorily since they tended to wrap up and unwrap rapidly, resulting in poor finish, insufficiently close tolerance control, and high tool breakage. They also generated an unsatisfactorily high noise level.

The gun drill of the invention utilizes several features which result in a drill meeting the penetration rate and durability requirements. The features, which may be used in several combinations, include: flutes providing a chip exit channels of about 40% greater cross section area than the chip exit channels provided on commercially available straight fluted gun drills; a cutting head section of tungsten carbide or other suitable material and having a back taper about three times as great as the back taper provided on the cutting head sections of similar commercially available gun drills; coolant passages, relief surfaces, gashes, and undercuts for better cooling and removal of chips and fines; leading and trailing margins on the lands which define the flutes, with the relief surfaces being provided between the margins; appropriate corner tapers; and chip breakers. Of these features, the most important are the larger straight flutes, the increased back taper, and the arrangements for better cooling and removal of chips and fines.

IN THE DRAWINGS

FIG. 1 is a side elevation view of a gun drill embodying the invention with parts being shown broken away and in section.

FIG. 2 is an end view of the cutting face end of the gun drill of FIG. 1 taken in the direction of arrows 2—2 of that figure.

FIG. 3 is a cross section view of the gun drill taken in the direction of arrows 3—3 of FIG. 1.

FIG. 4 is an enlarged elevation view of a portion of the cutting head section of the gun drill of FIG. 1, the orientation of the figure being in accordance with the arrows 4—4 of FIG. 2.

FIG. 5 is a perspective view of a portion of the cutting head section of the gun drill of FIG. 1.

The gun drill is constructed of a shank section 12, a cutting head section 14 secured to one end 16 of the shank section, and a collet 18 secured to the other end 20 of the shank section. The shank section 12 has straight lands 22 and 24 joined by a web section 26. Two such lands have been found to be preferable. The flutes defined by the lands and providing chip exit channels are radially formed to give a thin web and land cross section having high strength. One shank section flute 28 is visible in FIG. 1, with the other flute being on the hidden side of the shank section. The cross section area of the flutes are increased approximately 40% as compared to conventional gun drills previously used in similar applications.

The cutting head section 14 has straight lands 30 and 32 joined by a web section 34, the lands 30 and 32 and web section 34 effectively being continuations of the lands 22 and 24 and web section 26 of the shank section 12. Similarly, the cutting head section flutes 36 and 38 are effectively continuations of the flutes of the shank section. Flute 38 is illustrated as being an effective continuation of flute 28, for example. Each land 30,32 on the cutting head section has a leading margin 40,42 and a trailing margin 44,46 with a relief surface 48,50 arcuately between the leading and trailing margins being provided. Thus, the leading margins and trailing margins are formed on first and second diameters 52 and 54 which are slightly larger than the diameter of the circle defining the relief surfaces.

The cutting head section 14 and the shank section 12 provide sufficient length to the gun drill for the desired penetration. In drilling master cylinder bores, for example, the penetration may be about six to eight inches.

The collet 18 is formed for mounting the tool. The collet has an axially extending connecting passage 56 adapted to be connected to a source of coolant under pressure. Coolant passages 58 and 60 are provided through the lands of the cutting head section and the shank section so that the ends 62 and 64 thereof open into the collet coolant passage 58 and through the cutting face 66 of the cutting head section. The axes 68 and 70 of the coolant passages formed through the lands are axially parallel to the drill axis 72 and located on a drill diameter 74 which is arcuately positioned between the first diameter 52 extending through the leading margins and the second diameter 54 extending through the trailing margins. The angle between the first and second diameters is preferably in the range of about 75° to 90°. The diameter 74 passing through the coolant passage axes 68 and 70 is, therefore, arcuately displaced from the first and second diameters 52 and 54 approximately 35°–45°.

Each flute is preferably radially formed on a radius 76,78 which is at least 0.3 times as large as the drill first diameter 52. The portions of the land surfaces defining the flutes adjacent the leading margins 40 and 42 are flat sections 80 and 82 extending tangentially from the radially formed surface portions 84 and 86 on chords 88 and 90 which are adjacent to and parallel to the first diameter 52 which extends through the leading margins. Thus, the radially formed surfaces 84 and 86 may extend arcuately for approximately 120°. By providing flutes on such a radius in relation to the drill diameter, the flute areas are increased approximately 40% as compared to conventional straight fluted gun drills.

Conventional gun drills have a back taper formed on the tungsten carbide cutting head section of approximately 0.0004 inch to 0.0006 inch per inch of the length. The drill embodying the invention has a back taper from diameter $D_1$ to diameter $D_2$ approximately three times as great, and preferably within the range of 0.0012 inch to 0.0014 inch per inch of length. Shank section 12 has a maximum diameter $D_3$ which is less than the diameter $D_2$ of the cutting head section.

In order to remove fines that otherwise tend to collect on the relief surfaces 48 and 50 between the leading and trailing margins of the lands, an axially extending undercut 92,94 is provided through each of the arcuately extending relief surfaces 48,50 arcuately adjacent each trailing margin 44,46. Each undercut 92,94 extends radially inward to a depth sufficient to open the undercut at one end 96,98 to coolant flow from the coolant passages 58 and 60 at the cutting face 66 and at the other end 100, (the other end of undercut 94 not being illustrated) to pass coolant and fines flushed from the relief surfaces 48 and 50 to the surface areas of the lands 22 and 24 on the smaller diameter shank section 12.

Gashes 102 and 104, which are preferably radially formed, are provided on either side of the web section 26 on axes 106 and 108 which are skew to the drill axis 72. Each of these gashes 102,104 passes through a portion of the cutting end face 66, a portion of the web section 26, and a portion of one of the lands 30,32. Each gash intersects one of the flutes 36,38 and one of the coolant passages 58,60 so as to open the coolant passages to the flutes. The intersection of the coolant passages covers at least one-half the diameter thereof to provide sufficient coolant flow.

In grinding the tool, the cutting face 66 from the leading margin to the trailing margin of each land is ground at a slight conical angle relative to the axis of the drill so that each leading margin, including the portion thereof extending toward the drill point formed on the drill axis and being a part of the cutting face, extends slightly further outward than does the similar portion of the land at the trailing margin. This is shown at 110 in FIG. 4. A slight taper 112,114 of approximately 4° is provided on each trailing margin 44,46 adjacent the cutting face 66 and extending back of the cutting face for a short distance. The sharp points which may be created between the skew gashes and the coolant passages radially inward of the trailing margins may be ground off to a slightly flater configuration as shown at 116 and 118. The portion of the web section having surfaces 120 and 122 formed as part of each skew gash 102 and 104 adjacent the cutting face 66 may be radially undercut slightly, particularly near the drill point 124 on the cutting face, to provide for chip breaking.

What is claimed is:

1. A straight fluted gun drill for drilling blind holes in aluminum to a depth of about six to ten times the hole diameter at drill penetration rates on the order of sixty inches per minute at a low noise level and with a drill life on the order of one thousand and more drilled holes between regrinds, said drill comprising:

a straight fluted shank section having a collet on one end; a straight fluted cutting head section having one end rigidly joined to the other end of said shank section and in coaxial relation with said shank section;

said shank section having a pair of oppositely disposed straight lands joined by a web section through which the axis of the drill extends, said lands defining circumferentially therebetween a pair of oppositely disposed radially formed straight flutes which provide chip exit channels, and a coolant passage formed in each of said lands in axially parallel relation to each other and to the drill axis and opening at one end into a connecting passage formed through said collet, said shank section having a maximum diameter throughout the length of said lands and flutes which is less than the minimum diameter of said cutting head section;

said cutting head section having a web section, a pair of oppositely disposed lands defining circumferentially therebetween a pair of oppositely disposed radially formed straight flutes providing chip exit channels, and axially extending coolant passages through the lands thereof, said cutting head section lands each having a leading margin and a trailing margin with the circumferential outer surface between said margins being relieved radially inward of said drill to provide an arcuately extending relief surface, said cutting head section, web section and lands and flutes and coolant passages being in axial alignment with said shank section, web section and lands and flutes and coolant passages to form axially extending continuations thereof;

said cutting head section having a back taper of about 0.0012–0.0014 inch diameter decrease per inch of length, a cutting end face on the free end thereof through which said coolant passages open, a pair of radially formed gashes each formed on an axis skew to the drill axis, each of said gashes passing through a portion of said cutting end face and through a portion of said web section and through a portion of one of said lands and intersecting one of said flutes and also intersecting at least one-half the diameter of one of said coolant passages at the end thereof so as to open the coolant passage to the flute;

said leading margins being on a first diameter of said drill and said trailing margins being on a second diameter of said drill and said coolant passages having their axes passing through a third diameter of said drill located arcuately between and about 45° from each of said first and second diameters;

said cutting head section having an axially extending undercut provided through each of said arcuately extending relief surfaces arcuately adjacent a trailing margin and extending radially inward to a depth sufficient to open the undercuts at one end to coolant flow from said coolant passages at the cutting face and at the other end to pass coolant to the relief surfaces of said shank section lands, said undercuts providing for the flushing of fines which otherwise tend to collect on said relief surfaces;

said radially formed flutes each being formed on a radius which is at least 0.3 of said drill first diameter, said flutes each having a longitudinally extending flat section defined by one of said lands adjacent one of said leading edges and extending tangentially from the circle defined by said radially formed flute radius.

2. A gun drill cutting head section adapted to be mounted on and secured to a drill shank-carrying section to make a complete gun drill, said cutting head section comprising: an axially extending body having a cutting end and a mounting end, said body being defined by a web center section and a pair of diametrically opposed lands defining circumferentially therebetween a pair of axially parallel diametrically opposed flutes forming chip exit channels;

each of said lands having a leading margin and a trailing margin circumferentially separated by a relief surface of lesser cross section diameter than the cross section diameter of said margins, said leading margins each having a chip breaker undercut at the cutting end, said trailing margins being circumferentially spaced about 90° from said leading margins;

a coolant passage in each of said lands extending axially parallel to the axis of said cutting head section with one end opening through said cutting end and the other end opening through said mounting end, the axes of said coolant passages being located in a plane passing through the axis of said cutting head section and arcuately spaced about 45° from said leading and trailing margins;

each of said chip exit channels being defined by side surfaces of said lands and said web with all of said side surfaces from a trailing margin to a line location inwardly spaced from a leading margin being defined as arcuate sections of a cylinder subtending through an arc substantially more than 90° and on the order of 120°;

and relief means at the cutting end providing for flushing of drilled material generated during drill use.

3. A straight fluted gun drill having a cutting end and a collet end and comprising:

a pair of straight lands joined by a web section and defining therewith a pair of flutes providing chip exit channels; each of said lands having an arcuate outer surface extending circumferentially about one-fourth of the total drill circumference, a leading margin and a trailing margin on opposite edges of said outer surface with the portion of said outer surface between said margins being relieved radially inward for a portion of the length of the gun drill extending from said cutting end toward said collet end, the remaining portion of the land outer surface extending along the length of the gun drill to said collet end being of lesser diameter than the diameter of said radially relieved surface;

a straight coolant passage provided in each of said lands and extending parallel to the gun drill axis from said cutting end to said collet end, said collet end having a passage therein providing a connection for coolant under pressure and into which said straight coolant passages open to receive coolant;

said flutes each being defined by a radially formed surface on one land, said web section and a part of the other land, and a flat surface formed on the other land adjacent the leading margin thereof and extending chordally inward parallel to a drill diameter passing through both of said leading margins, said flat surface being in tangential relation to said radially formed surface at the junction thereof, the radius of said radially formed surface being at least 0.3 of the drill diameter passing through said leading margins;

a first pair of reliefs radially formed in said drill cutting end on axes skew to the drill axis and opening into the ends of said collet passages and into said flutes to force coolant flow to said cutting end and conduct coolant from said coolant passages to said flutes at said cutting end;

a second pair of reliefs formed in said lands immediately adjacent and parallel to said trailing margins and extending from said cutting end for the axial length of said relieved outer surfaces to conduct coolant from said cutting end toward said collet end and flush fines from said relieved outer surfaces;

said lands for the axial length of said relieved outer surfaces having a back taper on the order of 0.0012 inch to 0.0014 inch per inch of drill length;

and said trailing margins immediately adjacent said cutting end each having a forward taper formed thereon at about a 4° angle to the outer surface of said land forming said trailing margin.

* * * * *